United States Patent
Terahara et al.

(10) Patent No.: US 6,761,989 B2
(45) Date of Patent: Jul. 13, 2004

(54) POLYMER ELECTROLYTE AND METHOD FOR PRODUCING THE SAME

(75) Inventors: Atsushi Terahara, Tsukuba (JP); Katsuhiko Iwasaki, Tsukuba (JP); Takashi Ikeda, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 114 days.

(21) Appl. No.: 09/742,115

(22) Filed: Dec. 22, 2000

(65) Prior Publication Data

US 2001/0041279 A1 Nov. 15, 2001

(30) Foreign Application Priority Data

Dec. 27, 1999 (JP) .......................... 11-370689
Mar. 7, 2000 (JP) ....................... 2000-061768

(51) Int. Cl.[7] .................. H01M 8/10; H01M 6/18
(52) U.S. Cl. ................. 429/33; 429/30; 429/304; 429/314; 429/317
(58) Field of Search ................ 429/33, 30, 304, 429/314, 317

(56) References Cited

U.S. PATENT DOCUMENTS

| | | | |
|---|---|---|---|
| 3,751,376 A | | 8/1973 | Quentin et al. |
| 5,300,228 A | | 4/1994 | Sugaya et al. |
| 5,362,836 A | * | 11/1994 | Helmer-Metzmann et al. ............ 528/125 |
| 5,403,675 A | * | 4/1995 | Ogata et al. .................. 429/33 |
| 5,424,151 A | * | 6/1995 | Koksbang et al. .......... 429/213 |
| 5,429,759 A | | 7/1995 | Andrieu et al. |
| 5,438,082 A | | 8/1995 | Helmer-Metzmann et al. |
| 5,561,202 A | | 10/1996 | Helmer-Metzmann et al. |
| 5,741,408 A | * | 4/1998 | Helmer-Metzmann et al. .......................... 204/252 |
| 5,834,566 A | | 11/1998 | Helmer-Metzmann et al. |
| 5,977,241 A | * | 11/1999 | Koloski et al. ............. 524/502 |
| 5,985,477 A | | 11/1999 | Iwasaki et al. |

FOREIGN PATENT DOCUMENTS

| | | |
|---|---|---|
| EP | 0008894 A1 | 3/1980 |
| EP | 0575801 A1 | 12/1993 |
| EP | 0932213 A1 | 7/1999 |
| JP | 64-9230 A | 1/1989 |
| JP | 10-45913 A | 2/1998 |
| WO | WO 95/32236 | 11/1995 |
| WO | WO 96/29359 | 9/1996 |
| WO | WO96/29360 A1 | 9/1996 |

* cited by examiner

Primary Examiner—Patrick Ryan
Assistant Examiner—Julian Mercado
(74) Attorney, Agent, or Firm—Birch, Stewart, Kolasch & Birch, LLP

(57) ABSTRACT

Provided is a polymer electrolyte containing a block copolymer comprising one or more blocks having sulfonic acid groups and one or more blocks having substantially no sulfonic acid group, and at least one block among all blocks is a block having aromatic rings in the main chain thereof, and a method for producing the same. The polymer electrolyte is suitable for a proton conductive film of a fuel cell due to excellent water resistance and heat resistance, and high proton conductivity.

11 Claims, No Drawings

POLYMER ELECTROLYTE AND METHOD FOR PRODUCING THE SAME

BACKGROUND OF THE INVENTION

1. Field of the Invention

The present invention relates to a polymer electrolyte, particularly, a polymer electrolyte suitably used for a fuel cell and a method for producing the same.

2. Description of the Related Art

As a proton conductive polymer electrolyte used in a solid polymer-type fuel cell, perfluorosulfonic acid-based materials typically including Nafion (trade mark of Dupont) are mainly used conventionally because of their excellent property as a fuel cell.

However, this material is very expensive which is believed to be a serious problem in wide-spreading a powder generation system using a fuel cell in the future.

Under such circumstances, there are recently activating developments of cheap polymer electrolytes which can replace the perfluorosulfonic acid-based materials. Among others, materials obtained by introducing sulfonic acid groups into an aromatic polyether which is excellent in heat resistance and has high film strength are recognized as hopeful, and for example, JP-A (Kohyo publication) No. 11-502249 describes a sulfonated polyether ketone-based polymer electrolyte, and JP-A Nos. 10-45913 and 10-21943 describe a sulfonated polyether sulfone-based polymer electrolyte.

In these materials, when the amount of introduced sulfonic acid group is larger, proton conductivity increases generally, however, water absorption of a polymer tends to increase simultaneously. When a film produced from a polymer having high water absorption property is used in a fuel cell, water produced in using the cell causes large dimension change and reduction in strength.

On the other hand, JP-A (Kohyo publication) No. 10-503788 describes a polymer electrolyte obtained by introducing sulfonic acid groups into a styrene-(ethylene-butylene)-styrene triblock copolymer. There is a fear of low heat resistance of this block copolymer since the main chain of the copolymer is flexible.

SUMMARY OF THE INVENTION

An object of the present invention is to provide a novel polymer electrolyte excellent in water resistance, having high heat resistance, and suitable for a proton conductive film of a cheap fuel cell, and a method for producing the same.

The present inventors have intensively studied for attaining the above-mentioned object, and resultantly, found that a polymer electrolyte containing a block copolymer having a specific combination of blocks has an excellent property as a proton conductive film for a fuel cell, and completed the present invention.

Namely, the present invention relates to (1) a polymer electrolyte containing a block copolymer comprising one or more blocks having sulfonic acid groups and one or more blocks having substantially no sulfonic acid group, and at least one block among all blocks is a block having aromatic rings in the main chain thereof. Also, the present invention relates to (2) a method for producing a polymer electrolyte of (1), comprising the steps of reacting a precursor of a block having a repeating unit represented by below described general formula [1], [2] or [3] with a precursor of a block having a repeating unit represented by the general formula [4] to produce a block copolymer, and then sulfonating the copolymer. Further, the present invention relates to (3) a fuel cell obtained by using a polymer electrolyte of (1).

DETAILED DESCRIPTION OF THE INVENTION

The polymer electrolyte of the present invention contains a block copolymer comprising one or more blocks having sulfonic acid groups and one or more blocks having substantially no sulfonic acid group, and in which at least one block among all the blocks is a block having aromatic rings in the main chain thereof.

In the present invention, the term block means a polymer in which two or more units of the same kind of repeating units are connected. The term block copolymer means a polymer in which two or more blocks are directly bonded or bonded via a connecting group, namely, a polymer comprising a plurality of blocks composed of two kinds or more repeating units.

In the present invention, the term block containing sulfonic acid groups means a block in which 0.5 or more in average of sulfonic acid groups (represented by —SO₃H) are bonded to one repeating unit constituting a block, at any portion of the repeating unit.

Bonding form of the sulfonic acid groups to repeating units constituting a block is not particularly restricted, and a structure in which sulfonic acid groups are directly bonded to aromatic rings is preferable since synthesis thereof is relatively easy.

On the other hand, in the present invention, the term block containing substantially no sulfonic acid group means a block in which the introduced amount of sulfonic acid group is 0.1 or less in average per one repeating unit constituting a block.

In the present invention, the block having aromatic rings in the main chain thereof may be a block containing sulfonic acid groups, a block containing substantially no sulfonic acid group, or both of them.

In the present invention, examples of the block containing sulfonic acid groups include blocks obtained by introducing sulfonic acid groups into blocks composed of polystyrene, poly(α-methylstyrene), poly(allyl phenyl ether), poly (phenyl glycidyl ether), poly(phenylene ether), polyphenylene sulfide, polyether ether ketone, polyether ether sulfone, polysulfone, poly(phenylmethylsiloxane), poly (diphenylsiloxane), poly(phenylmethylphosphazene), poly (diphenylphosphazene), epoxy resins and the like.

Among them, blocks obtained by introducing sulfonic acid groups into a block having a repeating unit represented by the general formula [1], a block having a repeating unit represented by the general formula [2], or a block composed of an epoxy resin, are preferably used.

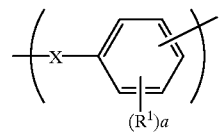

[1]

In the formula [1], X represents —O—, —S—, —NH— or direct bond, R¹ represents an alkyl group having 1 to 6 carbon atoms, an alkoxy group having 1 to 6 carbon atoms or a phenyl group, and a is an integer from 0 to 3. When a plurality of R¹s are present, these may be the same or different.

Examples of the block having a repeating unit represented by the general formula [1] include poly(phenylene), poly (aniline), poly(phenylene ether), poly(phenylene sulfide) and the like.

Among them, poly(phenylene ether) represented by the general formula [1] wherein X is —O— is preferable, and specific examples thereof include poly(1,4-phenylene ether), poly(2-methyl-1,4-phenylene ether), poly(2,6-dimethyl-1,4-phenylene ether), poly(2-phenyl-1,4-phenylene ether), poly (2,6-diphenyl-1,4-phenylene ether), poly(2-methyl-1,3-phenylene ether), poly(2,6-dimethyl-1,3-phenylene ether), poly(2-phenyl-1,3-phenylene ether), poly(2-6-diphenyl-1,3-phenylene ether) and the like, and among them, poly(1,4-phenylene ether), poly(2-phenyl-1,4-phenylene ether), poly (2,6-diphenyl-1,4-phenylene ether) are more preferable, and poly(2-phenyl-1,4-phenylene ether) is further preferable.

The precursor of a block having a repeating unit represented by the general formula [1] can be produced by a known method. For example, in the case of poly(phenylene ether), it can be produced by an oxidation polymerization method in which phenol is oxidized in the presence of a catalyst, or a method (called Ullmann reaction) in which a halogenated phenol is condensed in the presence of a catalyst and alkali.

Here, the term precursor of a block means a homopolymer having a reaction site which becomes a block by a copolymerization reaction.

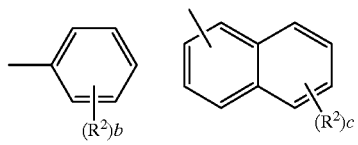

[2]

In the formula [2], $Ar^1$ represents a group selected from the following structures,

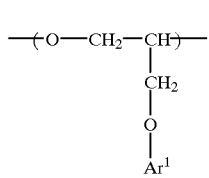

in the above formulae, $R^2$ represents an alkyl group having 1 to 6 carbon atoms, an alkoxy group having 1 to 6 carbon atoms, a phenyl group or a phenoxy group, b is an integer from 0 to 4, and c is an integer from 0 to 6. When a plurality of $R^2$s are present, these may be the same or different.

The precursor of a block having a repeating unit represented by the general formula [2] is obtained, for example, by ring-opening polymerization of a glycidyl ether having an aromatic ring, of the following formula:

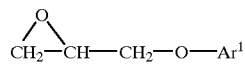

Specific examples thereof include phenyl glycidyl ether, o-toluyl glycidyl ether, m-toluyl glycidyl ether, p-toluyl glycidyl ether, 2,3-dimethylphenyl glycidyl ether, 2,4-dimethylphenyl glycidyl ether, 2,5-dimethylphenyl glycidyl ether, 2,6-dimethylphenyl glycidyl ether, 2,3,4-trimethylphenyl glycidyl ether, 2,4,6-trimethylphenyl glycidyl ether, 2,4,5,6-tetramethylphenyl glycidyl ether, 2-ethylphenyl glycidyl ether, 4-ethylphenyl glycidyl ether, 2-propylphenyl glycidyl ether, 4-n-propylphenyl glycidyl ether, 4-propylphenyl glycidyl ether, 2-butylphenyl glycidyl ether, 4-butylphenyl glycidyl ether, 4-i-propylpheyl glycidyl ether, 2-biphenyl glycidyl ether, 4-biphenyl glycidyl ether, 1-naphthyl glycidyl ether, 2-naphthyl glycidyl ether and the like. These may be used alone, or a plurality of glycidyl ethers may be used to form a copolymer.

If necessary, precursors of blocks obtained by copolymerizing the above-mentioned glycidyl ether having an aromatic ring with an epoxy compound containing no aromatic ring can be used.

Examples of the epoxy compound containing no aromatic ring include ethylene oxide, propylene oxide, 1,2-epoxybutane, cyclohexane epoxide, epifluorohydrin, epichlorohydrin, epibromohydrin, trifluoropropylene oxide, methyl glycidyl ether, ethylglycidyl ether, propylglycidyl ether, butylglycidyl ether and the like.

When such a copolymer is used as one component of a block, the amount of a glycidyl ether component having an aromatic ring is preferably 60% by weight or more, more preferably 80% by weight or more since if the ratio of an epoxy component is higher, heat resistance of the whole polymer decreases.

Regarding the ring-opening polymerization of a glycidyl ether compound containing an aromatic ring with an epoxy compound containing no aromatic ring, a lot of methods are known, and any of these known polymerization methods can be used. The number of repeating units represented by the general formula [2] is preferably from 2 to 200, more preferably from 5 to 50.

The term block composed of an epoxy resin means a block obtained from a precursor composed of a resin having one or more epoxy groups in the molecule (epoxy resin). It includes also a block having resultantly such a form even if an epoxy resin is not used as a precursor.

Among blocks composed of an epoxy resin, blocks composed of an epoxy resin having an aromatic ring in the main chain are preferable, and blocks having a repeating unit represented by the following general formula [3] are further preferable.

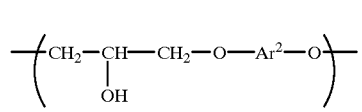

[3]

In the formula [3], $Ar^2$ represents a group selected from the following structures,

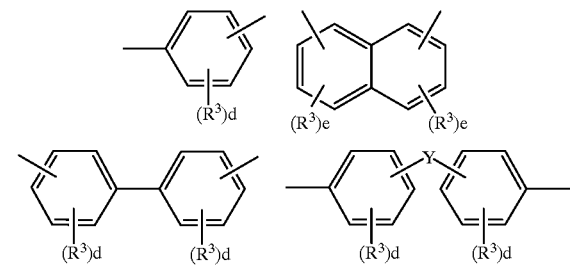

-continued

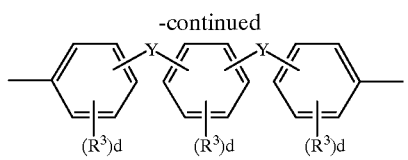

in the above formulae, $R^3$ represents an alkyl group having 1 to 6 carbon atoms, an alkoxy group having 1 to 6 carbon atoms or a phenyl group, d is an integer from 0 to 3, and e is an integer from 0 to 2. When a plurality of $R^3$s are present, these may be the same or different. Y represents —O—, —S—, an alkylene group having 1 to 20 carbon atoms, a halogenated alkylene group having 1 to 10 carbon atoms or an alkylenedioxy group having 1 to 20 carbon atoms. When a plurality of Ys are present, these may be the same or different.

The epoxy resin having a repeating unit represented by the general formula [3] can be usually synthesized by a known method of synthesizing an epoxy resin. As this method, there are listed a method in which a diol compound represented by Ho—Ar—OH with epichlorohydrin in the presence of an alkali, and a method in which a diol compound and a diglycidyl ether compound are reacted.

Specific examples of the diol compound represented by Ho—Ar—OH include hydroquinone, resorcinol, catechol, 1,2-dihydroxynaphthalene, 1,4-dihydroxynaphthalene, 1,5-dihydroxynaphthalene, 2,6-dihydroxynaphthalene, 2,7-dihydroxynaphthalene, 4,4'-dihydroxybiphenyl, 2,4'-dihydroxybiphenyl, 2,2'-dihydroxybiphenyl, 4,4'-dihydroxydiphenylmethane, 1,1-bis(4-hydroxyphenyl) ethane, 2,2-bis(4-hydroxyphenyl)propane, 2,2-bis(4-hydroxyphenyl)butane, 1,1-bis(4-hydroxyphenyl) cyclohexane, 2,2-bis(4-hydroxyphenyl)-1,1,1,3,3,3-hexafluoropropane, 1,1-bis(4-hydroxyphenyl)-1-phenylethane, bis(4-hydroxyphenyl)diphenylmethane, 9,9-bis(4-hydroxyphenyl)fluorene, α, α'-bis(4-hydroxyphenyl)-1,4-diisopropylbenzene, 4,4'-dihydroxydiphenyl ether, 2,2'-dihydroxydiphenyl ether, bis(4-hydroxyphenyl) sulfide, bis(2-hydroxyphenyl) sulfide, 1,2-bis(4-hydroxyphenyl) ethane, 1,2-bis(4-hydroxyphenoxy)ethane, 1,2-bis(3-hydroxyphenoxy)ethane, 1,2-bis(4-hydroxyphenoxy) propane, 1,3-bis(4-hydroxyphenoxy)propane, 1,4-bis(4-hydroxyphenoxy)butane, 1,6-bis(4-hydroxyphenoxy) hexane, diethylene glycol bis(4-hydroxyphenyl) ether and the like.

The number of repeating units constituting a block composed of an epoxy resin having a repeating unit represented by the general formula [3] is preferably from 2 to 200, more preferably from 4 to 50.

As the block containing substantially no sulfonic acid group, blocks composed of an aromatic polyether having a repeating unit represented by the general formula [4] are preferable because of high heat resistance.

[4]

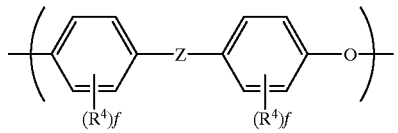

In the general formula [4], $R^4$ represents an alkyl group having 1 to 6 carbon atoms, and f is an integer from 0 to 4. When a plurality of $R^4$s are present, these may be the same or different. Z represents —CO— or —SO$_2$—.

Specifically, a block composed of polyether ketone, and a block composed of polyether sulfone are listed.

Among others, polyether sulfone of the general formula [4] wherein Z is —SO$_2$— is more preferable due to its higher solubility in a solvent.

Polyether sulfone, one example of a precursor of a block of the general formula [4], can be synthesized, for example, by polycondensing 4,4'-dihydroxydiphenylsulfone with 4,4'-dichlorodiphenylsulfone.

The weight-average molecular weight of a precursor of a block composed of polyether sulfone is preferably from 2000 to 500000, more preferably from 2000 to 100000. When the molecular weight is less than 2000, film strength and heat resistance of a copolymer may lower, while when over 500000, solubility may decrease.

Next, a method for producing a polymer electrolyte of the present invention will be illustrated.

The method for producing a block copolymer by chemically bonding two or more precursors of blocks is not particularly restricted, and a suitable known method corresponding to a combination of blocks can be used.

For example, when poly(phenylene ether) as one example of a precursor of a block of the general formula [1] and polyether sulfone as one example of a precursor of a block of the general formula [4] are bonded, there is a method in which poly(phenylene ether) having a hydroxyl group remaining at the end and polyether sulfone having halogen remaining at the end are condensed in the presence of an alkali. Further, when poly(phenylene ether) having a hydroxyl group remaining at the end and polyether sulfone having a hydroxyl group remaining at the end are bonded, they can also be bonded according to the analogous condensation reaction using as a connecting agent a dihalogen compound such as 4,4'-difluorobenzophenone, 4,4'-dichlorodiphenylsulfone and the like.

On the other hand, when poly(phenyl glycidyl ether) as one example of a precursor of a block of the general formula [2] and polyether sulfone as one example of a precursor of a block of the general formula [4] are bonded, synthesis can be effected by converting the end hydroxyl group of polyether sulfone having a hydroxyl group at the end into alkali metal phenolate, conducting ring-opening polymerization of glycidyl ether containing an aromatic ring by using the phenolate as a polymerization initiation point, subsequently, conducting sulfonation.

Alternatively, there are exemplified a method in which a precursor of a block is first synthesized by copolymerizing phenyl glycidyl ether with glycidyl ether containing halogen which can be used in a block forming reaction such as epichlorohydrin and the like, then, the precursor is condensed with polyether sulfone having a hydroxyl group remaining at the end in the presence of an alkali, and other methods.

Further, when an epoxy resin as one example of a precursor of a block of the general formula [3] and polyether sulfone as one example of a precursor of a block of the general formula [4] are bonded, there is a method in which a glycidyl group remaining at the end of the epoxy resin is bonded to a hydroxyl group remaining at the end of the polyether sulfone by ring-opening addition.

When polyether sulfone is used as one precursor of a block, a block copolymerization reaction is preferably conducted in a suitable solvent though it can be effected in molten condition using no solvent. As the solvent, aromatic hydrocarbon-based solvent, ether-based solvents, ketone-based solvent, amide-based solvent, sulfone-based solvent, sulfoxide-based solvent and the like can be used, and amide-based solvents are preferable because of high solubility. Here, as the amide-based solvent, N,N-dimethylformamide, N,N-dimethylacetamide, N-methylpyrrolidone and the like are listed.

The reaction temperature of the block copolymerization reaction is preferably from 20 to 250° C., more preferably from 50 to 200° C.

In a block copolymer used in the present invention, the amount of a block having substantially no sulfonic acid group is preferably from 60 to 95% by weight, further preferably from 70 to 90% by weight based on the total amount of the block copolymer. When the amount of a block having substantially no sulfonic acid group is over 95% by weight, sufficient performance as a polymer electrolyte may not be obtained since ion exchange capacity in a block copolymer is low after introduction of sulfonic acid groups, while, when less than 60% by weight, water resistance of a block copolymer after introduction of sulfonic acid groups may decrease.

In a block copolymer used in the present invention, a method for introducing sulfonic acid groups into a specific block is not particularly restricted, and there are listed: (a) a method in which a precursor of a block having previously introduced sulfonic acid groups and a precursor of a block having substantially no sulfonic acid group are copolymerized; (b) a method in which a copolymer composed of a block to which a sulfonic acid group is to be introduced and a block to which a sulfonic acid group is to be substantially not introduced is produced, and then sulfonic acid groups are selectively introduced into the block to which a sulfonic acid group is to be introduced in the above-mentioned copolymer; and other methods. The above-mentioned method (b) is preferable since the precursor of a block having previously introduced sulfonic acid groups may block a copolymerization reaction.

In the above-mentioned method (a), a precursor of a block having sulfonic acid groups can be produced, for example, by sulfonating the precursor of a block. As a sulfonating agent, known sulfonating agents such as sulfuric acid having a concentration of 90% or more, fuming sulfuric acid, chlorosulfonic acid, $SO_3$ and the like can be used.

In the above-mentioned method (b), as the method for selectively introducing sulfonic acid groups into a copolymer, there is (c) a method in which functional groups present in a block to which a sulfonic acid group is to be introduced but not present in a block to which a sulfonic acid group is to be substantially not introduced is utilized. Alternatively, there is envisaged (d) a method utilizing difference in reactivity on a sulfonation reaction of a block to which a sulfonic acid group is to be introduced with a block to which a sulfonic acid group is to be substantially not introduced.

As an example of the above-mentioned method (d), there is a method for producing a polymer electrolyte comprising the steps of reacting a precursor of a block having a repeating unit represented by the general formula [1], [2] or [3] with a precursor of a block having a repeating unit represented by the general formula [4] to produce a block copolymer, and subsequently, sulfonating the copolymer.

For example, in a sulfonation reaction of an aromatic ring using sulfuric acid as a sulfonating agent, it is known that the reactivity of an aromatic ring of a block having a repeating unit represented by the general formula [4] is lower in comparison with that of an aromatic ring of a block having a repeating unit represented by the general formula [1], [2] or [3].

Therefore, by sulfonating with sulfuric acid, under suitable conditions, a block copolymer obtained by reacting a precursor of a block having a repeating unit represented by the general formula [4] and a precursor of a block having a repeating unit represented by the general formula [1], [2] or [3], there can be produced a block copolymer in which sulfonic acid groups are selectively introduced into a block having a repeating unit represented by the general formula [1], [2] or [3] but a sulfonic acid group is not substantially introduced into a block represented by the general formula [4].

In a process of sulfonation (introduction of a sulfonic acid group), known sulfonating agents such as sulfuric acid having a concentration of 90% or more, fuming sulfuric acid, chlorosulfonic acid, $SO_3$ and the like can be used. Among them, sulfuric acid having a concentration of 90% or more is preferable, and sulfuric acid having a concentration of 94 to 99% by weight is more preferable.

Further, organic solvents which are not concerned with a sulfonation reaction may also be added in small amount together with sulfuric acid, so that a sulfonation reaction of a block copolymer progresses in a uniform system. The amount of these organic solvents is not included in % by weight of sulfuric acid concentration described above.

Dissolution into sulfuric acid and sulfonation of a block copolymer progress simultaneously, and at room temperature, the reaction is usually completed in 2 to 20 hours to give a uniform solution. The sulfonated block copolymer can be recovered by pouring a sulfuric acid solution into a large amount of water.

The concentration of a block copolymer against sulfuric acid is preferably from 1 to 50% by weight, more preferably from 5 to 30% by weight. The reaction temperature is preferably from 0 to 80° C., more preferably from 20 to 40° C.

Further, in producing an electrolyte of the present invention, there can be used additives such as plasticizers, stabilizers, releasing agents and the like used in usual polymers, in amount in a range wherein the object of the present invention does not deteriorate.

Moreover, in producing an electrolyte of the present invention or in processing such as film forming and the like, and molding an electrolyte of the present invention, an intermolecular crosslinking structure can be introduced, in amount in a range wherein the object of the present invention does not deteriorate.

Precursors of a block having a repeating unit represented by the general formulae [1] to [4] is synthesized by a previously secured technology, and is a cheap material used in large scale. Also copolymers obtained by synthesis using them as a raw material and by sulfonation thereof are extremely inexpensive as compared with fluorine-based materials such as Nafion and the like.

When a polymer electrolyte of the present invention is used in a fuel cell, it is usually used in the form of film (hereinafter, sometimes referred to as fuel cell polymer electrolyte film). A method for converting a polymer electrolyte of the present invention into a film is not particularly restricted, and a method of forming a film from solution condition (solution cast method) is preferable.

Specifically, a film is formed by dissolving a polymer electrolyte in a suitable solvent, casting the solution on a glass substrate, and removing the solvent. The solvent used in film formation is not particularly restricted provided it can dissolve a polymer electrolyte and can be removed thereafter, and there can be suitably used aprotic polar solvents such as N,N-dimethylformamide, N,N-dimethylacetamide, N-methyl-2-pyrrolidone, dimethylsulfoxide and the like, chlorine-based solvents such as dichloromethane, chloroform, 1,2-dichloroethane, chlorobenzene, dichlorobenzene and the like, alcohols such as methanol, ethanol, propanol and the like, and alkylene glycol monoalkyl ethers such as ethylene glycol monomethyl ether, ethylene glycol monoethyl ether, propylene glycol monomethyl ether, propylene glycol monoethyl ether and the like. These may be used alone, and if necessary, two or more solvents may also be mixed and used. Among them, dimethylformamide, dimethylacetamide, N-methylpyrrolidone and dimethylsulfoxide are preferable due to high solubility of the polymer.

The thickness of a film is not particularly restricted, and preferably from 10 to 200 μm. For obtaining film strength which can stand practical use, a thickness of 10 μm or more is preferable, and for lowering film resistance, namely, for improving power generation ability, a thickness of 200 μm or less is preferable. The film thickness can be controlled depending on solution concentration or applied thickness on a substrate.

Next, a fuel cell of the present invention will be illustrated.

A fuel cell of the present invention can be produced by bonding a catalyst and a conductive substance as a collector on both surfaces of a fuel cell polymer electrolyte film.

The catalyst is not particularly restricted providing it can activate an oxidation and reduction reaction with hydrogen or oxygen, and known catalysts can be used and preferable is use of a fine particle of platinum. A fine particle of platinum is often supported on particulate or fibrous carbon such as activated carbon, graphite and the like before being used preferably.

Regarding the conductive substance as a collector, known materials can be used, and porous carbon non-woven fabric or carbon paper are preferable since they transport a raw material gas to a catalyst efficiently.

Regarding a method for bonding a platinum fine particle or carbon carrying thereon a platinum fine particle to porous carbon non-woven fabric or carbon paper, and a method for bonding it to a polymer electrolyte film, there can be used, for example, known methods described in J. Electrochem. Soc. Electrochemical Science and Technology, 1988, 135 (9), 2209, and the like.

EXAMPLES

The following examples illustrate the present invention below, but do not limit the scope of the present invention at all.

Comparative Example 1

4,4'-dihydroxydiphenylsulfone, 4,4'-dihydroxybiphenyl and 4,4'-dichlorodiphenylsulfone were polycondensed at a molar ratio of 7:3:10 at a temperature from 200 to 290° C. using diphenylsulfone as a solvent in the co-existence of potassium carbonate. The resulted polymer was sulfonated with conc. sulfuric acid to synthesize a random copolymer in which a sulfonic acid group had been introduced into a biphenyl unit.

Reference Example 1

99 mg of anhydrous cuprous chloride and 266 mg of 2-methylbenzimidazole were stirred for 15 minutes under atmospheric pressure at room temperature in 1 ml of toluene. To this was added 8.5 g of 2-phenylphenol and 30 ml of toluene, and the mixture was stirred for 5 hours at 50° C. under oxygen atmosphere. After completion of the reaction, methanol containing hydrochloric acid was poured into this to precipitate a polymer, and this was filtrated and dried to obtain poly(2-pheylphenylene ether) (hereinafter, referred to as PE1).

12.25 g of 2-phenylphenol and 1.49 g of 4,4'-dihydroxybiphenyl were oxidation-polymerized using the same catalyst and using chlorobenzene as a solvent, to obtain poly(2-pheylphenylene ether) having a hydroxyl group on both ends (hereinafter, referred to as PE2).

Reference Example 2

99 mg of anhydrous cuprous chloride and 65 mg of N,N,N',N'-tetramethyl-1,3-propanediamine were stirred for 15 minutes under atmospheric pressure at room temperature in 5 ml of chlorobenzene. To this was added 4.43 g of 2,6-diphenylphenol, 0.37 g of 4,4'-dihydroxybiphenyl and 15 ml of chlorobenzene, and the mixture was stirred for 5 hours at 60° C. under oxygen atmosphere. After completion of the reaction, methanol containing hydrochloric acid was poured into this to precipitate a polymer, and this was filtrated and dried to obtain poly(2,6-dipheylphenylene ether) having hydroxyl groups on both ends (hereinafter, referred to as PE3).

Example 1

Into a flask equipped with an azeotropic distillation apparatus was charged 3.0 g of Sumika Excel PES5003P (manufactured by Sumitomo Chemical Co., Ltd., hydroxyl group-ended polyether sulfone), 0.75 g of PE1, 0.04 g of potassium carbonate, 15 ml of N,N-dimethylacetamide (hereinafter, referred to as DMAc) and 3 ml of toluene, the mixture was heated while stirring, and the solution was dehydrated under azeotropic condition of toluene and water, then, toluene was distilled off. To this was added 0.05 g of 4.4'-difluorobenzophenone, and the mixture was stirred while heating at 160° C. for 5 hours. The reaction solution was added dropwise to a large amount of acidic methanol containing hydrochloric acid, the resulted precipitate was recovered by filtration, and dried under reduced pressure at 80° C. to obtain 3.8 g of a block copolymer.

2 g of the resulted block copolymer was stirred together with 20 ml of 98% sulfuric acid at room temperature to obtain a uniform solution, then, further stirred for 2 hours. The resulted solution was added into a large amount of ice water dropwise, and the resulted precipitate was recovered by filtration. Further, mixer washing with ion exchange water was repeated until the washing solution became neutral, then, the polymer was dried at 40° C. under reduced pressure to obtain a sulfonated block copolymer.

Example 2

Into a flask equipped with an azeotropic distillation apparatus was charged 50 g of Sumika Excel PES5003P, 0.36 g of potassium carbonate, 180 ml of DMAc and 25 ml of toluene. The system was purged with nitrogen, and the mixture was heated while stirring for 2 hours under azeotropic condition of toluene and water, then, toluene was distilled off. To this was added 9.5 g of 4,4'-difluorobenzophenone, and the mixture was stirred while heating at 160° C. for 5 hours. The reaction solution was added dropwise to a large amount of methanol, and the produced precipitate was recovered by filtration. The resulted precipitate was washed while stirring for 5 hours with a large amount of acetone with heating under reflux, then, removed out from acetone, and dried under reduced pressure at 80° C. to obtain 45 g of chain end fluorinated polyether sulfone.

Into a flask equipped with an azeotropic distillation apparatus was charged 0.75 g of PE2, 0.03 g of potassium carbonate, 15 ml of DMAc and 3 ml of toluene. The solution was dehydrated under azeotropic condition of toluene and water, then, toluene was distilled off. To this was added 3 g of the chain end fluorinated polyether sulfone, and the mixture was stirred while heating at 160° C. for 5 hours. The reaction solution was added dropwise to a large amount of acidic methanol containing hydrochloric acid, and the resulted precipitate was recovered by filtration, and dried under reduced pressure at 40° C. to obtain 3.6 g of a block copolymer.

The resulted block copolymer was sulfonated using 98% sulfuric acid in the same manner as in Example 1, to obtain a sulfonated block copolymer.

Example 3

9.8 g of a block copolymer was obtained by reacting 8.0 g of Sumika Excel PES5003P, 2.0 g of PE3, 0.2 g of potassium carbonate, 0.26 g of 4,4'-difluorobenzophenone, 50 ml of DMAc and 5 ml of toluene in the same manner as in Example 1. The resulted block copolymer was sulfonated using 98% sulfuric acid, to obtain a sulfonated block copolymer.

Reference Example 3

0.2 g of anhydrous Fe(III) chloride and 1 ml of propylene oxide were stirred for 10 minutes at 0° C. in 4 ml of ether, then, ether and volatile components were removed by raising the temperature to room temperature and under reduced pressure, to prepare a catalyst. To this was added 28.53 g of phenyl glycidyl ether and 0.925 g of epichlorohydrin, and the mixture was stirred while heating at 100° C. for 1 hour and at 160° C. for 8 hours. The polymerization solution was poured into methanol to obtain a precipitate which was filtrated and dried to obtain a polymer of poly(phenyl glycidyl ether-co-epichlorohydrin)(hereinafter, referred to as GE1).

In the same manner, 17.74 g of phenyl glycidyl ether and 2.37 g of epichlorohydrin were used to synthesize a polymer of poly(phenyl glycidyl ether-co-epichlorohydrin) (hereinafter, referred to as GE2).

Example 4

8.0 g of PES5003P and 0.1 g of potassium carbonate were dissolved in 40 ml of DMAc and 5 ml of toluene, and the mixture was heated to distill toluene. To this was added 2.0 g of GE1, and the mixture was stirred while heating at 160° C. for 3.5 hours. The reaction solution was poured into dilute hydrochloric acid to precipitate a polymer which was filtrated, washed with water and dried to recover a block copolymer.

6.0 g of the resulted block copolymer and 40 g of conc. sulfuric acid were mixed and dissolved, then, the solution was poured into a large amount of water to precipitate a polymer which was filtrated, washed with water and dried to obtain a sulfonated block copolymer.

Example 5

A block copolymerization reaction and sulfonation reaction were conducted in the same manner as in Example 4 except that 3.0 g of GE1 was used, to obtain a sulfonated block copolymer.

Example 6

A block copolymerization reaction and sulfonation reaction were conducted in the same manner as in Example 4 except that 2.0 g of GE2 was used instead of GE1, to obtain a sulfonated block copolymer.

Reference Example 4

19.8 g of hydroquinone, 18.5 g of epichlorohydrin and 8.8 g of sodium hydroxide were heated while stirring in 100 ml of water to synthesize an epoxy polymer having a glycidyl group on both ends (hereinafter, referred to as EP1).

In the same manner, 49.3 g of 1,2-bis(3-hydroxyphenoxy) ethane, 22.2 g of epichlorohydrin and 12.0 g of sodium hydroxide were used to synthesize an epoxy polymer (hereinafter, referred to as EP2).

Example 7

20.0 g of PES5003P was dissolved in 100 ml of DMAc, to this was added 3.87 g of EP1, 0.321 g of 4,4'-dihydroxybenzophenone and 0.2 ml of quinoline, and the mixture was stirred while heating at 150° C. for 4 hours. The reaction solution was poured into dilute hydrochloric acid to precipitate a polymer which was filtrated, washed with water and dried to recover a block copolymer.

20.0 g of the resulted block copolymer was mixed with and dissolved into 80 g of conc. sulfuric acid, then, poured into a large amount of water to precipitate a polymer which was filtrated, washed with water and dried to obtain a sulfonated block copolymer.

Example 8

A copolymerization reaction and sulfonation reaction were conducted in the same manner as in Example 7 using 40.0 g of PES5003P, 7.05 g of EP2, 0.686 g of 4,4'-dihydroxybenzophenone and 0.5 ml of quinoline. Cast film formation from a DMAc solution was conducted to obtain a film which had a tensile strength of 450 kg/cm$^2$ and a temperature at 10% heating loss of 265° C.

Example 9

A copolymerization reaction and sulfonation reaction were conducted in the same manner as in Example 7 using 8.0 g of PES5003P, 1.50 g of EP2, 0.14 g of 4,4'-dihydroxybiphenyl and 0.2 ml of quinoline, to recover a sulfonated block copolymer.

Example 10

A copolymerization reaction and sulfonation reaction were conducted in the same manner as in Example 7 using 8.0 g of PES5003P, 2.25 g of EP2, 0.223 g of 4,4'-dihydroxybiphenyl and 0.2 ml of quinoline, to recover a sulfonated copolymer.

The sulfonated block copolymers obtained in Examples 1 to 10 and the sulfonated random copolymer obtained in Comparative Examples 1 were dissolved each in a concentration of 5 to 20% by weight into DMAc, and cast on glass substrates to form films which were dried to obtain films. The proton conductivity of the film was measured according to an alternating method under conditions of a temperature of 80° C. and a humidity of 95%. Further, the dried film was immersed in de-ionized water at 100° C. for 2 hours, then, increase in the film weight was measured based on the weight in dry condition, to give water absorption of the film. The results are summarized in Table 1.

TABLE 1

|  | Proton conductivity (S/cm) | Water absorption (%) |
|---|---|---|
| Comparative example 1 | $1.3 \times 10^{-2}$ | 24 |
| Example 1 | $1.0 \times 10^{-1}$ | 79 |
| Example 2 | $8.4 \times 10^{-2}$ | 63 |
| Example 3 | $5.1 \times 10^{-2}$ | 38 |
| Example 4 | $5.7 \times 10^{-2}$ | 43 |
| Example 5 | $1.4 \times 10^{-1}$ | 55 |
| Example 6 | $6.3 \times 10^{-2}$ | 41 |
| Example 7 | $7.3 \times 10^{-2}$ | 7 |
| Example 8 | $1.1 \times 10^{-1}$ | 35 |
| Example 9 | $1.3 \times 10^{-1}$ | 32 |
| Example 10 | $2.8 \times 10^{-1}$ | 86 |

From the above-mentioned results, it is known that a polymer electrolyte containing a block copolymer of the present invention has the equivalent or more proton conductivity, water absorption suppressed relatively low, and excellent water resistance, as compared with a polymer electrolyte into which a sulfonic acid group has been randomly introduced.

A polymer electrolyte of the present invention can be produced at lower cost, and can reduce production cost of a fuel cell using this electrolyte. Further, it is suitable for a proton conductive film of a fuel cell due to excellent water resistance and heat resistance, and high proton conductivity.

What is claimed is:

1. A polymer electrolyte containing a block copolymer comprising one or more blocks having sulfonic acid groups and one or more blocks having substantially no sulfonic acid group, and at least one block among all the blocks is a block having aromatic rings in the main chain thereof, wherein the one or more blocks having substantially no sulfonic acid group is/are introduced from precursors having a weight-average molecular weight of not less than 2000.

2. The polymer electrolyte according to claim 1, wherein the blocks having sulfonic acid groups have a structure where the sulfonic acid groups are directly bonded to the aromatic rings.

3. The polymer electrolyte according to claim 1 or 2, wherein the blocks having sulfonic acid groups are blocks composed of the repeating units represented by the general formula [1] into which sulfonic acid groups have been introduced:

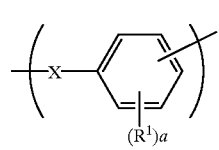

[1]

in the formula, X represents —O—, —S—, —NH— or direct bond, $R^1$ represents an alkyl group having 1 to 6 carbon atoms, an alkoxy group having 1 to 6 carbon atoms or a phenyl group, and a is an integer from 0 to 3, and when a plurality of $R^1$s are present, these may be the same or different.

4. The polymer electrolyte according to claim 3, wherein X is —O— in the general formula [1].

5. A fuel cell obtainable by using a polymer electrolyte of claim 4.

6. A fuel cell obtainable by using a polymer electrolyte of claim 3.

7. The polymer electrolyte according to claim 1 or 2, wherein the amount of the block having substantially no sulfonic acid group is from 60 to 95% by weight based on the weight of the whole block copolymer.

8. A fuel cell obtainable by using a polymer electrolyte of claim 7.

9. A method for producing a polymer electrolyte of claim 1 or 2, comprising the steps of: reacting a precursor of a block having repeating units represented by the general formula [1], [2] or [3], with a precursor of a block having a repeating unit represented by the general formula [4] to produce a block copolymer; and then sulfonating said copolymer.

10. The method for producing a polymer electrolyte according to claim 9, wherein it comprises a step of sulfonating the block copolymer with sulfuric acid having a concentration of 90% or more.

11. A fuel cell obtainable by using a polymer electrolyte of any one of claim 1 to 2.

* * * * *